United States Patent
Kato et al.

(10) Patent No.: US 6,761,315 B2
(45) Date of Patent: Jul. 13, 2004

(54) CONTROLLER CAPABLE OF OPERATING PLURAL OPERATION OBJECTS BY SWITCHING DISPLAY OF OPERATION SURFACE OF OPERATION MEMBER

(75) Inventors: Katsumi Kato, Fukushima-ken (JP); Tadamitsu Sato, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 194 days.

(21) Appl. No.: 09/922,330

(22) Filed: Aug. 3, 2001

(65) Prior Publication Data

US 2002/0020749 A1 Feb. 21, 2002

(30) Foreign Application Priority Data

Aug. 11, 2000 (JP) ........................................ 2000-243784

(51) Int. Cl.[7] ............................................... G11B 21/12
(52) U.S. Cl. ................. 235/462.45; 398/106; 369/24.01
(58) Field of Search ............................ 369/24.01, 29.02, 369/30.26; 235/462.45; 398/106, 114

(56) References Cited

U.S. PATENT DOCUMENTS

| | | | | |
|---|---|---|---|---|
| 4,078,257 A | * | 3/1978 | Bagley | 708/145 |
| 4,890,832 A | * | 1/1990 | Komaki | 463/44 |
| 5,235,328 A | * | 8/1993 | Kurita | 340/825.72 |
| 5,353,016 A | * | 10/1994 | Kurita et al. | 340/825.22 |
| 5,422,783 A | * | 6/1995 | Darbee | 361/680 |
| 5,450,079 A | * | 9/1995 | Dunaway | 341/23 |
| D363,932 S | * | 11/1995 | Madill et al. | |
| 5,537,107 A | * | 7/1996 | Funado | 340/825.72 |
| 6,407,779 B1 | * | 6/2002 | Herz | 348/734 |
| 6,437,836 B1 | * | 8/2002 | Huang et al. | 348/734 |
| 6,532,592 B1 | * | 3/2003 | Shintani et al. | 725/141 |
| 6,553,345 B1 | * | 4/2003 | Kuhn et al. | 704/275 |

FOREIGN PATENT DOCUMENTS

JP  5-2446  1/1993

* cited by examiner

Primary Examiner—Karl D. Frech
Assistant Examiner—Daniel A. Hess
(74) Attorney, Agent, or Firm—Brinks Hofer Gilson & Lione

(57) ABSTRACT

An operation member is provided with a planar input device, and a detachable display sheet is overlaid on the surface of the planar input device. There are two types of display sheets, in which input items are different. Cutouts are formed at the respective peripheral edge portions thereof, and a determination device for detecting these cutouts is provided. Wireless communication is performed between the operation member and a host, and the display sheet is replaced according to the function performed by the host.

31 Claims, 4 Drawing Sheets

CONTROLLER CAPABLE OF OPERATING PLURAL OPERATION OBJECTS BY SWITCHING DISPLAY OF OPERATION SURFACE OF OPERATION MEMBER

BACKGROUND OF THE INVENTION

1. Field of the Invention

The present invention relates to a controller by which wireless operations are possible and, more particularly, to a controller by which operations of plural operation objects are possible by switching the display of the operation surface of an operation member.

2. Description of the Related Art

Electronic apparatuses, such as television receivers, are supplied with wireless controllers so that various operations become possible from a remote position. The surface of the controller is provided with button switches by which a channel can be selected and the sound volume can be adjusted.

Recently, with the increasing popularity of the Internet, controllers have appeared which enable the browsing of home pages (web pages) and transmission and reception of mail by using the screen of a television receiver. This type of controller is provided with an input mechanism to be used for mail operation, in addition to the input mechanism for selecting a channel. During mail operation, a key arrangement of a keyboard device is displayed on, for example, the television screen, and the appropriate input mechanism is operated on the basis of this display screen.

However, in the above-described conventional controller, when many functions are added, the number of operation keys which form the combined input mechanism increases correspondingly, and the ease of operation is compromised. The controller becomes large and cumbersome. Furthermore, if controllers for selecting a channel and for using the Internet are provided separately, the management and storage of controllers becomes inconvenient. In addition, if other devices such as video recorders for recording and replaying videotapes, and other functions are added to the controller, the number of operation keys further increases, and the ease of operation, etc., is further compromised.

SUMMARY OF THE INVENTION

The present invention has been made to solve the above-described problems. It is an object of the present invention to provide a controller to which many functions may be added without compromising the ease of operation.

To achieve the above-mentioned object, the present invention provides a controller which enables wireless communication between an operation member and a host. The operation member comprises a transmission mechanism, an input mechanism, and a display member for displaying an input portion of the input means, the display member is capable of changing the display of an input portion and/or an input item of the input portion. A control section generates a transmission signal corresponding to the display of the display member when the input mechanism is operated.

The input mechanism may be a planar input device to which a coordinate position can be input, and the display member may be overlaid on the planar input device.

In the present invention, since the displays of input portions and input items are switched according to the function, it becomes unnecessary to provide an operation member with many input portions and input items, and the ease of operation can be improved. Moreover, it becomes possible to reduce the size of the operation member. Furthermore, since the input portions and the input items can be easily changed, operation members specialized for respective hosts are not formed, the operation members are shared, and only the display member is changed. Therefore, handling various hosts can be easily performed.

For example, the display member may be a display sheet which can be attached to and detached from the operation member. A determination mechanism may determine the type of the display sheet attached, and the control section generates a transmission signal according to the type of display sheet determined by the determination mechanism.

Each display sheet may be provided with a cutout or a projection at a different position according to the type thereof, and the existence of the cutout or the projection may be determined by the determination mechanism. Alternatively a bar code may be formed, and the type of the display sheet determined by the determination mechanism.

The display member may be a display panel capable of switching display contents, and an input portion and/or an input item displayed on the display panel may be switched in accordance with a switching signal supplied from the host to the operation member.

Only basic input portions may be displayed on the display panel, and when the functions are to be switched, the above-mentioned display sheet may further be overlaid on the display panel, so that an operation is performed.

The above and further objects, aspects and novel features of the invention will become more fully apparent from the following detailed description when read in conjunction with the accompanying drawings.

In another aspect of the present invention, a controller enables wireless communication between an operation member and a host, where the operation member comprises, a transmission mechanism, an input mechanism, a display member that displays an input portion of said input mechanism and a control section. The input portion includes input items, the display of one of the input portion and at least one input item being changeable, with the display member being overlaid on the input mechanism. A control section generates a transmission signal corresponding to a display of display member when the input mechanism is operated. The display member is a display panel having display contents that are switched by the operation member, and one of the input portions and at least one input items displayed on the display panel are switched in accordance with a switching signal supplied from the host to said operation member.

DESCRIPTION OF THE PREFERRED EMBODIMENTS

Figure 1:
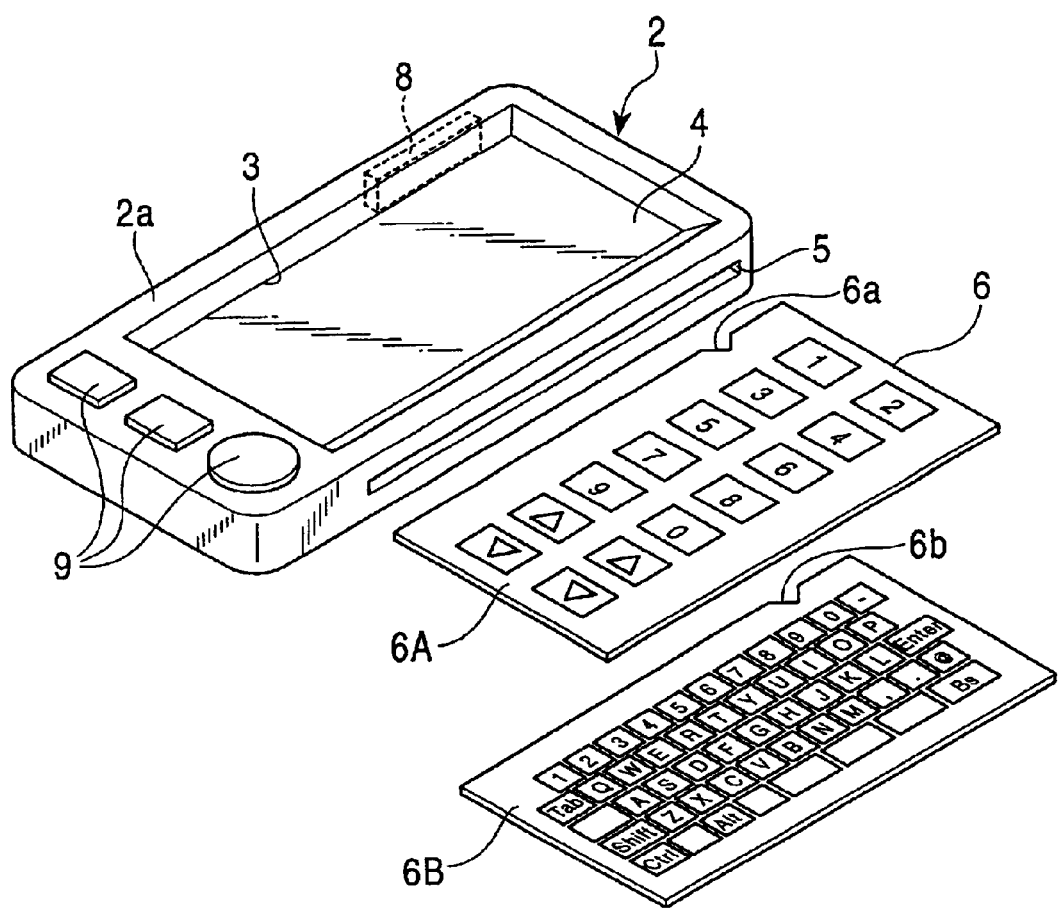
FIG. 1 is a schematic perspective view showing an operation member used in a controller according to the present invention.
Figure 2:
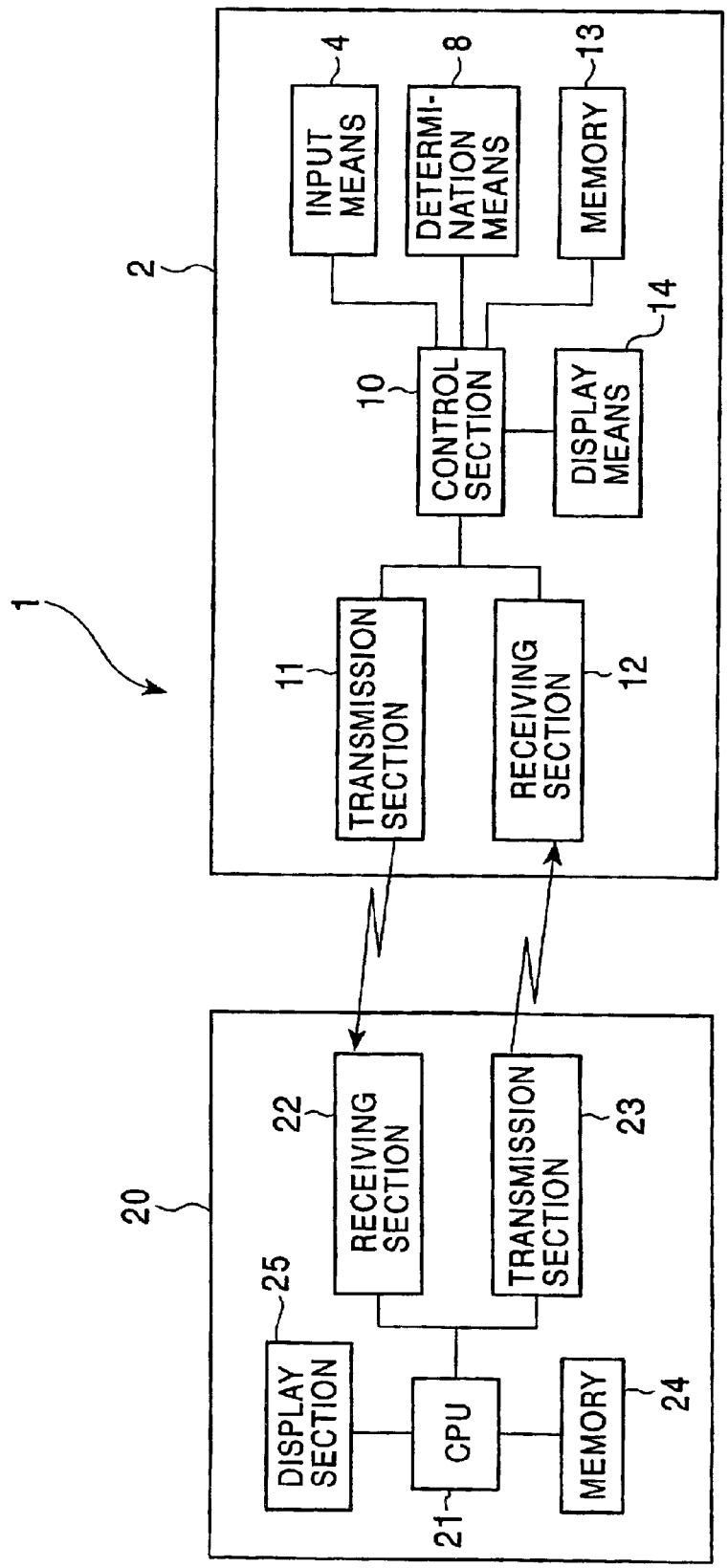
FIG. 2 is a functional block diagram showing the controller according to the present invention.

FIG. 1 is a schematic view showing an example of a controller according to the present invention. FIG. 2 is a functional block diagram showing the controller according to the present invention.

A controller 1 shown in FIG. 1 is designed to enable wireless communication by radio waves between a host (television receiver) 20 and an operation member 2. By operating the operation member 2, a plurality of functions provided in the host 20 can be controlled. Examples of the functions include the browsing of home pages, and transmission and reception of mail, in addition to television programs and movies displays normally displayed on a television screen, but are not limited thereto. Wireless communication by optical communication, such as via infrared light, may also be performed between the operation member 2 and the host 20.

The operation member 2 is made of a resin box-type case 2a, and a rectangular cutout portion 3 is formed on the operation surface side (the obverse surface) of the case 2a. A planar input device 4 (or input mechanism) is mounted in the cutout portion 3. The planar input device 4 can detect an input coordinate position. Examples of the types of detectors that may be mounted in the planar input device 4 include a pressure-sensitive-type, X-Y-axis contact-type, and electrostatic-type pad.

A pressure-sensitive-type pad is one in which a pair of resistance sheets are arranged facing each other with a very small space therebetween. X-axis electrodes are formed on both ends of one of the resistance sheets, and Y-axis electrodes are formed on both ends of the other resistance sheet. The coordinate position is detected by measuring a voltage applied between the X-axis electrode and the Y-axis electrode, which is generated when the pad is pushed in, causing the respective sheets to be brought into contact with each other. An X-Y-axis contact-type pad is one in which X-axis electrodes and Y-axis electrodes are arranged in a matrix, and in which a coordinate position is detected by sequentially supplying electrical current to the X-axis electrodes and by detecting a signal output from the Y-axis electrodes. An electrostatic-type pad is one in which X-axis electrodes and Y-axis electrodes are provided facing each other at right angles to each other with an insulating sheet therebetween, and in which a coordinate position is detected by determining the change in electrostatic capacity on the pad surface which is generated when the operator touches the pad.

An elongated insertion opening 5 is provided on one side of the case 2a, and a display sheet 6 as a display member is attached/detached via this insertion opening 5. The display sheet 6 is made of a flexible resin and the sheet is overlaid on the planar input device 4. The insertion opening 5 permits different display sheets 6 to be swapped in a single, straightforward manner and the addition of the insertion opening 5 to the case 2a provides an economical, efficient solution to changing the display sheets 6.

This display sheet 6 may be a sheet member made of paper with input portions and input items formed thereon, and which is laminated by transparent resin sheets. Furthermore, the case 2a may be provided with another operation member 9 so that, for example, functions are changed using this operation member 9.

Input portions and input items, which are different for each function provided in the host 20, are printed on the display sheet 6. For example, input portions for selecting a television channel and for adjusting a sound volume are formed on a display sheet 6A shown in FIG. 1. The input portions of the display sheet 6B used to input characters, etc., during mail operation can be arranged similar to a keyboard device.

Triangular cutouts 6a and 6b are formed at mutually different positions at the peripheral edge portions of the display sheets 6A and 6B. By switching the positions of the cutouts according to each display sheet 6 in the above-described manner, the number of sheets which can be attached can be increased. Although not shown, the cutouts may be holes in the display sheets 6A and 6B rather than notches in the edges. Alternatively, projections, rather than cutouts, may be formed on the display sheet 6. The display sheet 6 is not limited to those described above. If a video recorder is integrally built into the host 20, a display sheet for a video recorder may be provided. If a game machine is provided in the host 20, a display sheet for a game may be provided. Also, a display sheet for browsing home pages may be provided.

As shown in FIG. 1, the operation member 2 is provided with a determination mechanism 8. The determination mechanism 8 is provided inside the case 2a on a side opposite to the side in which the insertion opening 5 is formed and at the position where the cutouts 6a and 6b are formed. This determination mechanism 8 can detect the existence of the different display sheets, being, in FIG. 1, display sheet 6A and display sheet 6B.

The determination mechanism 8 is formed of an optical system including a photocoupler, etc. For example, light-emitting elements such as LEDs are provided on the top side with the display sheets 6A and 6B held therebetween, and light-receiving elements such as photodiodes are provided on the bottom side, so that whether or not light can be received by the light-receiving elements is detected. Also, the determination mechanism 8 may be such that the switch output can be switched mechanically by the cutouts 6a and 6b, the projections, etc. In either case, the type of the display sheets 6A and 6B may be determined by completion of the appropriate circuit, be it optical, electrical, or mechanical. The cutout 6a and 6b and projection may thus be circuit completion structures.

Although in the determination mechanism 8, the determination of the display sheet 6 is made according to the position of the cutout, if the display sheets 6 to be attached and detached are of two types, the determination may be made based on whether or not there is a cutout. As a result of the foregoing, when the light-receiving section detects light only at the position of the cutout 6a, the determination mechanism 8 determines that the display sheet 6A is attached, and when light is detected only at the position of the cutout 6b, the determination mechanism 8 determines that the display sheet 6B is attached.

In addition to the determination of the display sheet 6A and the display sheet 6B, when a state in which light is received at both the positions of the cutouts 6a and 6b and a state in which light is not received at either position are set, the determination of a total of four kinds of sheets can be made.

As shown in FIG. 2, the operation member 2 is provided with a control section 10. The planar input device 4, the determination mechanism 8, a transmission section 11, a receiving section 12, and a memory 13 are connected to the control section 10. Meanwhile, the host 20 on the television receiver side is provided with a CPU 21 to which receiving section 22, a transmission section 23, a memory 24, and a display section 25 are connected.

In the operation member 2 formed in the above-described manner, the display sheet 6A or the display sheet 6B is inserted via the insertion opening 5. The display sheets 6A and 6B are inserted up to a position where the input portions and the input items can be seen from within the frame formed of the cutout portion 3, and are inserted up to a position where the display sheets 6A and 6B can be determined by the determination mechanism 8.

When the operation member 2 is to be used for selecting a television channel, the display sheet 6A is attached via the insertion opening 5. As a result, the determination mechanism 8 detects the cutout 6a and determines that the display sheet 6A is attached. At this time, a determination signal indicating that the display sheet 6A is attached is sent to the control section 10, and in the control section 10, a transmission signal corresponding to the display sheet 6A overlaid on the planar input device 4 is generated.

As a result of the above, for example, when the display of "channel 1" is pressed from above the display sheet 6A, only the portion of "channel 1" formed on the display sheet 6A is flexed, and the pressing-in force at this time causes the planar input device 4 overlaid below the display sheet 6A to be pressed. As a result, the coordinate position is detected by the planar input device 4, and data indicating this coordinate position is sent to the control section 10. In the control section 10, it is recognized that the position at which the planar input device 4 is operated is pressed in the portion of the display of "channel 1" on the basis of the data indicating the coordinate position, and a transmission signal corresponding to the display is generated. At this time, the transmission signal corresponding to "channel 1" may be read from the memory 13 in accordance with the data indicating the coordinate position. The transmission signal is transmitted to the host 20 via the transmission section 11. In the receiving section 22 of the host 20, the transmission signal is received, and control for switching the screen of the display section 25 to "channel 1" is performed by the CPU 21 provided in the host 20.

When an operation key formed on the display sheet 6A for adjusting sound volume is pressed, a transmission signal for changing the sound volume is generated based on the input data of the coordinate position, and a predetermined process is performed by the host 20.

In the host 20, when the display section 25 is changed from the channel switch function, etc. on the television screen to the function of transmitting and receiving mail, and the screen for transmitting and receiving mail is displayed on the display section 25, the display sheet 6A is removed from the case 2a, and the display sheet 6B is attached. At this time, in the determination mechanism 8, the cutout 6b is detected, and a transmission signal indicating that the display sheet 6B is attached is sent to the control section 10. In the control section 10, the operation input from the planar input device 4 is switched so that a transmission signal corresponding to the display sheet 6B is generated.

In the case of the foregoing, in the host 20, software for mail may be read from the memory 24 under the control of the CPU 21 so that the screen for transmitting and receiving mail is displayed on the display section 25.

When the functions are switched in the above-described manner, a switching signal for prompting the replacement of the display sheet 6 may be supplied to the operation member 2 from the host 20.

As for the switching signal, for example, a sound generating mechanism 14 may be provided within the operation member 2, and when the switching is performed from the television screen display function to the mail transmitting and receiving function, an instruction indicating which one of the display sheets 6 should be attached is generated by sound from the sound generating mechanism 14. Instead of the sound generating mechanism, a display mechanism 14 may be provided. In this case, an identification number, such as a serial number, may be written on each display sheet 6, so that this identification number is displayed by the display mechanism 14.

If an appropriate display sheet 6 is not attached within the case 2a or if an incorrect display sheet 6 is attached and is operated, the sound generating mechanism may generate a buzzer sound, and the display mechanism may indicate an error by displaying, for example, characters, or symbols.

In the case of the foregoing, in the host 20, a signal prompting the change of the display sheet 6 or a signal indicating an error is read from the memory 24 under the control of the CPU 21, and is transmitted to the operation member 2 from the transmission section 23. In the operation member 2, the signal is received by the receiving section 12, and predetermined control is performed by the sound generating mechanism (or display mechanism) 14.

Although not shown, a light-emitter, load generator, etc., may be provided in the operation member 2. In the case of the light-emitter, a light-emitting member such as an LED may be provided in the case 2a so that the LED is made to emit light when a misoperation is performed. In the case of the load generator, a vibration generator such as a motor may be provided within the case 2a so that the case 2a is vibrated by the motor when a misoperation is performed.

Next, a second embodiment of a controller of the present invention will be described below with reference to FIGS. 3 and 4.

Figure 4:
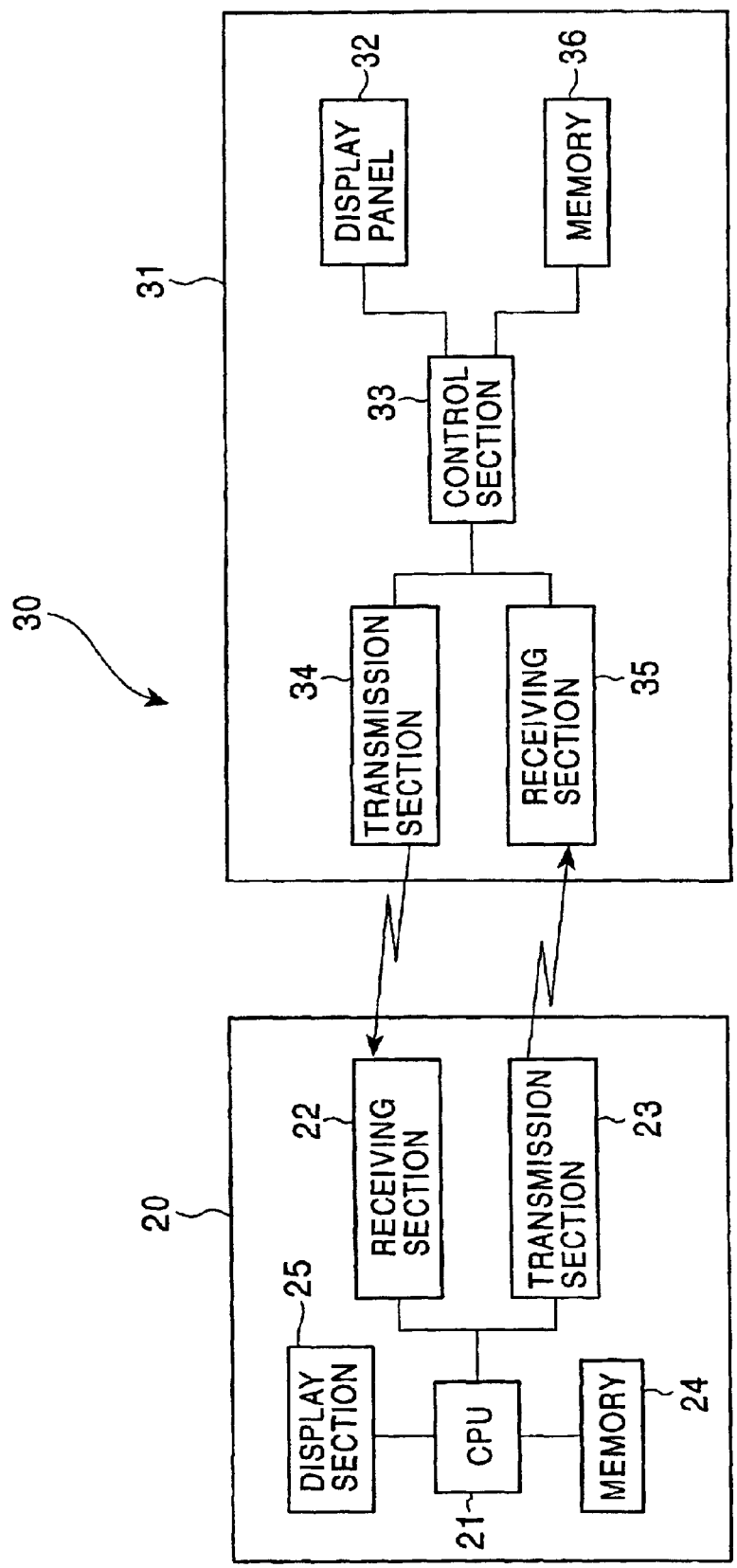
FIG. 4 is a functional block diagram showing the controller according to the present invention.

As shown in FIG. 4, a controller 30 of the present invention makes possible wireless communication by radio waves between the host (television receiver) 20 and an operation member 31. Since the host 20 in this embodiment is the same as that in the above-described controller 1, the description thereof is omitted.

Figure 3:
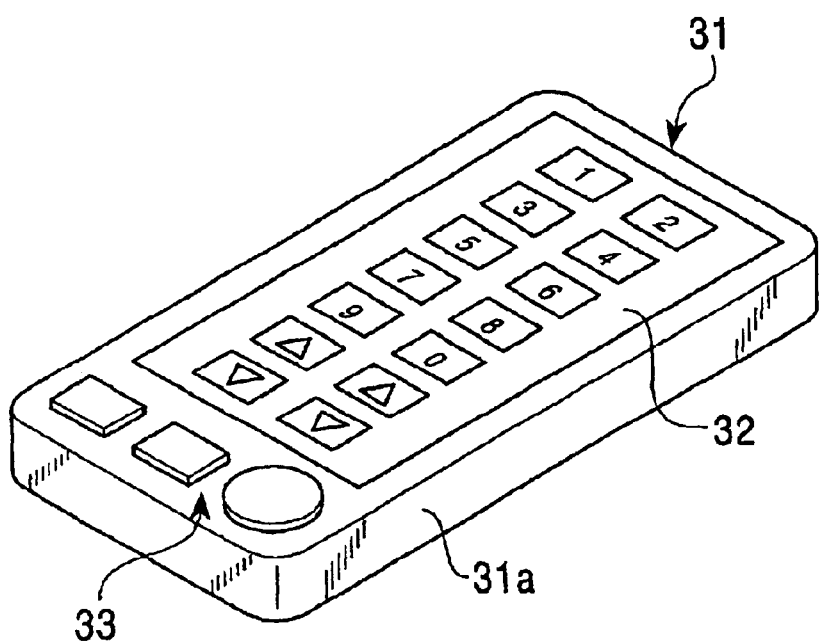
FIG. 3 is a schematic perspective view showing another operation member used in the controller according to the present invention.

The operation member 31 shown in FIG. 3 is provided with a thin display panel 32 formed of a liquid-crystal panel, an electroluminescent (EL) display panel, or the like on the surface of a case 31a. The display panel 32 changes the input portions and the input items displayed suchthat the display panel 32 becomes an operation surface for selecting a channel on a television screen or an operation surface for transmitting and receiving mail, but is not limited thereto. Also, this display panel 32 is such that the surface thereof becomes a surface on which an operation is performed, and as a result of the operation surface being pressed by a finger, a pen, etc., a predetermined transmission signal corresponding to the operation surface is generated.

For example, a liquid-crystal panel is laminated as the display panel 32 on the planar input device 4 shown in FIG. 1, and the input portions and the input items are displayed on the display panel 32. Then, when the display panel 32 is pressed, a predetermined portion of the planar input device 4 is indicated. For example, when the planar input device 4 is a pressure-sensitive type, the display panel 32 is deformed, causing a predetermined portion of the planar input device 4 to be pressed. Also, when the planar input device 4 is an electrostatic type, a coordinate can be input by the planar input device 4 by touching the display panel 32 with a conductor, such as a finger.

As shown in FIG. 4, the operation member 31 is provided with a control section 33. The display panel 32, a transmission section 34, a receiving section 35, and a memory 36 are connected to the control section 33.

In the host 20, when the display section 25 is switched to a television screen, display data (image data) is read from the memory 24 under the control of the CPU 21 and is transmitted from the transmission section 23 to the operation member 31. In the operation member 31, the display data is received by the receiving section 35, and the display of the display panel 32 is switched to that for selecting a channel or for adjusting a sound volume under the control of the control section 33. Also, when the display section 25 is switched to that for transmitting and receiving mail, in the CPU 21, display data for inputting characters, etc., shown on the display sheet 6B of FIG. 1, is loaded from the memory 24, and is transmitted to the operation member 31. In the operation member 31, the display data is transmitted to the display panel 32 by the control section 33, and the display of the display panel 32 is switched to that for inputting characters, etc.

The display data may be stored within the memory 36 of the operation member 31. For the switching of the display of the display panel 32 in this case, a specific code number corresponding to the input portion or the input item displayed on the display panel 32 is transmitted from the host 20 to the operation member 31. In the operation member 31, the code number is received, and the display data corresponding to the received code number may be read from the memory 36 and may be transmitted to the display panel 32, so that the display of the display panel 32 is switched.

The controller of the present invention is not limited to the above-described embodiments, and may be such that, for example, the above-described display sheets can be attached/detached on a thin display panel. In the case of only a display device, the controller may be used for selecting a channel, and when the controller is used for another function, a display sheet in accordance with each function may be attached.

In a controller which is used such that the display sheet 6 is attached/detached, a housing space for housing the display sheet 6 may be provided on the rear side of the case 2a.

Furthermore, the display sheet 6 may be stored within the case 2a, and a predetermined display sheet may be placed on the planar input device 4 to correspond to the switching of the functions. Also, different input portions and input items may be formed on both the obverse surface and the reverse surface of the display sheet 6.

In addition, other determination mechanisms are possible besides the optical systems described herein. For example, electrical determination mechanisms may be used. In this case, the case may contain electrical circuit(s) and the display sheets each contain at least one electrical circuit that corresponds to the electrical circuit(s) in the case. Examples include different display sheets that ground different numbers of the electrical circuits in the case or different parts of a singular circuit (and measuring the resistance). Similarly, more sophisticated circuit or chips may be formed on the display sheet if desired. In either case, the display sheets may be uniquely identified by the circuitry therein.

As has thus been described, according to the present invention, many functions may be provided by one operation member, and since many input portions and input items are not provided in the operation member, the ease of operation is not compromised. Moreover, it is possible to reduce the size of the operation member.

Furthermore, since bidirectional communication becomes possible between a host and an operation member, when functions are changed, the displays of the input portions and the input items are switched automatically.

Many different embodiments of the present invention may be constructed without departing from the spirit and scope of the present invention. It should be understood that the present invention is not limited to the specific embodiments described in this specification. To the contrary, the present invention is intended to cover various modification and equivalent arrangements included within the spirit and scope of the invention as hereafter claimed. The scope of the following claims is to be accorded the broadest interpretation so as to encompass all such modifications, equivalent structures and functions.

What is claimed is:

1. A controller which enables wireless communication between an operation member and a host, said operating member comprising:

a transmission mechanism;

an input mechanism;

a display member that displays an input portion of said input mechanism, the input portion including input items, display of one of the input portion and at least one input item being changeable, said display member being overlaid on said input mechanism; and a control section that generates a transmission signal corresponding to said display of said display member when said input mechanism is operated;

wherein said input mechanism is a planar input device to which a coordinate position can be input.

2. A controller according to claim 1, wherein said display member is a display sheet is attachable to and detachable from said operation member, said operation member comprises a determination mechanism that determines a type of said display sheet attached, the type of display sheet dependent on the contents therein, and said control section generates the transmission signal according to the type of display sheet determined by said determination mechanism.

3. A controller according to claim 2, wherein said display sheet comprises one of a cutout and a projection at a different position according to the type thereof, and the existence of said one of said cutout and said projection is determined by said determination mechanism.

4. A controller according to claim 2, further comprising a plurality of display sheets, each said display sheet having a unique combination of one of at least one cutout and at least one projection, and the determination mechanism determining a specific display sheet from the unique combination therein.

5. A controller according to claim 4, the unique combination comprising a unique number of said one of at least one cutout and at least one projection.

6. A controller according to claim 4, the unique combination comprising a unique position of said one of at least one cutout and at least one projection.

7. A controller according to claim 4, further comprising a case retaining the input mechanism and storing the display sheets therein.

8. A controller according to claim 2, the display sheet comprising opposing faces of different types, the type of the face of the display sheet more distal to the input mechanism determined by the determination mechanism.

9. A controller according to claim 8, the display sheet having one of at least one cutout and at least one projection, and the existence of the at least one of said cutout and the it least on, projection determined by said determination mechanism.

10. A controller according to claim 2, the display sheet having a circuit completion structure disposed in the display member, the determination mechanism determining the type of the display member from the existence and position of the circuit completion structure.

11. A controller according to claim 2, further comprising a case retaining the input mechanism and the display shoot therein, the case comprising a slot through which the display sheet is conveyed from an area internal to the case to an area external to the case.

12. A controller according to claim 2, the determining mechanism comprising an optical system.

13. A controller according to claim 12, the display sheet further comprising a bar code, the determining mechanism determining the type of the display sheet from the bar code.

14. A controller according to claim 2, the determining mechanism comprising a mechanical system having switches whose states are dependent on the type of the display sheet.

15. A controller according to claim 1, wherein said display member is a display sheet removable from said operation member, said operation member comprises a determination mechanism that determines contents of an obverse face of the display sheet, and said control section generates the transmission signal according to the contents of the obverse face of display sheet determined by said determination mechanism.

16. A controller according to claim 1, the input mechanism comprising one of a pressure-sensitive pad, X-Y-axis contact pad, and electrostatic pad.

17. A controller according to claim 1, wherein the display member comprises a display panel having display contents that are switched by the operation member, and one of the input portions and at least one input item displayed on said display panel are switched in accordance with a switching signal supplied from said host to said operation member.

18. A controller according to claim 17, the display panel comprising a liquid crystal display having contents displayed thereon switched in accordance with the switching signal.

19. An operation member according to claim 1, wherein the display member comprises a display panel and at least one display sheet, the display sheet being attachable and detachable from said operation member.

20. An operation member in wireless communication with a host, said operation member comprising:

A case;

a transmission mechanism disposed in the case, the transmission mechanism transmitting a transmission signal to the host;

a planar input mechanism to which a coordinate position can be input, the planar input mechanism disposed in the case;

a display member disposed in the case, the display member overlaid on the input mechanism when in an operational position; and a control section to generate the transmission signal corresponding to a contacted portion of said display panel in the operational postion.

21. An operation member according to claim 20, wherein at least one display member is a display sheet attachable and detachable from said operation member, said operation member further comprising a determination mechanism to determine the contents of the display sheet in the operational position, and the control section to establish an input portion of the input mechanism corresponding to the contents of the display sheet as determined by said determination mechanism.

22. An operation member according to claim 21, wherein the determination mechanism determines the contents of the display sheet in accordance with a physical structure of the display sheet.

23. An operation member according to claim 21, further comprising a plurality of display sheets, each display sheet having a unique physical structure.

24. An operation member according to claim 23, the physical structure of each display sheet comprising a unique number and positioning of one of at least one cutout and at least one projection.

25. An operation member according to claim 23, further comprising a case retaining the input mechanism and storing the display sheets therein.

26. An operation member according to claim 21, the display sheet comprising opposing faces having different contents disposed thereon, the contents of the face of the display sheet more distal to the input mechanism being determined by the determination mechanism.

27. An operation member according to claim 21, the determination mechanism determining the contents of the display sheet from one of completion and non-completion of at least one circuit by the display sheet.

28. An operation member according to claim 21, the case comprising a slot through which the display sheet is conveyed from an area internal to the case to an area external to the case.

29. An operation member according to claim 21, wherein the display member comprises a display panel having display contents that are switched by the operation member, and one of the input portions and at least one input item displayed on said display panel are switched in accordance with a switching signal supplied from said host to said operation member.

30. An operation member according to claim 21, wherein the display member comprises a display panel and at least one display sheet, the display sheet being attachable and detachable from said operation member.

31. An operation member according to claim 20, the input mechanism comprising one of a pressure-sensitive pad, X-Y-axis contact pad, and electrostatic pad.

* * * * *

UNITED STATES PATENT AND TRADEMARK OFFICE
CERTIFICATE OF CORRECTION

PATENT NO.   : 6,761,315 B2
DATED        : July 13, 2004
INVENTOR(S)  : Katsumi Kato et al.

It is certified that error appears in the above-identified patent and that said Letters Patent is hereby corrected as shown below:

Column 8,
Line 59, delete "it least on," and substitute -- at least one -- in its place.

Column 10,
Line 35, delete "claim 21," and substitute -- claim 20, -- in it place.

Signed and Sealed this

Eighteenth Day of January, 2005

JON W. DUDAS
*Director of the United States Patent and Trademark Office*